United States Patent [19]
Derbyshire

[11] 4,186,933
[45] Feb. 5, 1980

[54] KEYS FOR DRILL CHUCKS

[75] Inventor: George C. Derbyshire, Sheffield, England

[73] Assignee: The Jacobs Manufacturing Co., Ltd., Sheffield, England

[21] Appl. No.: 923,975

[22] Filed: Jul. 12, 1978

Related U.S. Application Data

[62] Division of Ser. No. 753,578, Dec. 22, 1976, abandoned.

[51] Int. Cl.² .............................................. B25B 13/44
[52] U.S. Cl. .................................... 279/1 K; 81/90 A
[58] Field of Search ......... 279/1 K; 81/90 A, 52.4 R, 81/52.4 A, 52.6

[56]  References Cited
U.S. PATENT DOCUMENTS

| 2,768,547 | 10/1956 | Noell | 81/52.4 R |
| 2,807,732 | 9/1957 | Kurtouich | 279/1 K |

FOREIGN PATENT DOCUMENTS 1457133  12/1976  United Kingdom .................. 279/1 K Primary Examiner—Gil Weidenfeld
Attorney, Agent, or Firm—Stephen J. Rudy

[57]  ABSTRACT

A key for a drill chuck, the key including a geared head part connected to a separately formed handle part of machined, forged, cast or moulded form.

3 Claims, 28 Drawing Figures

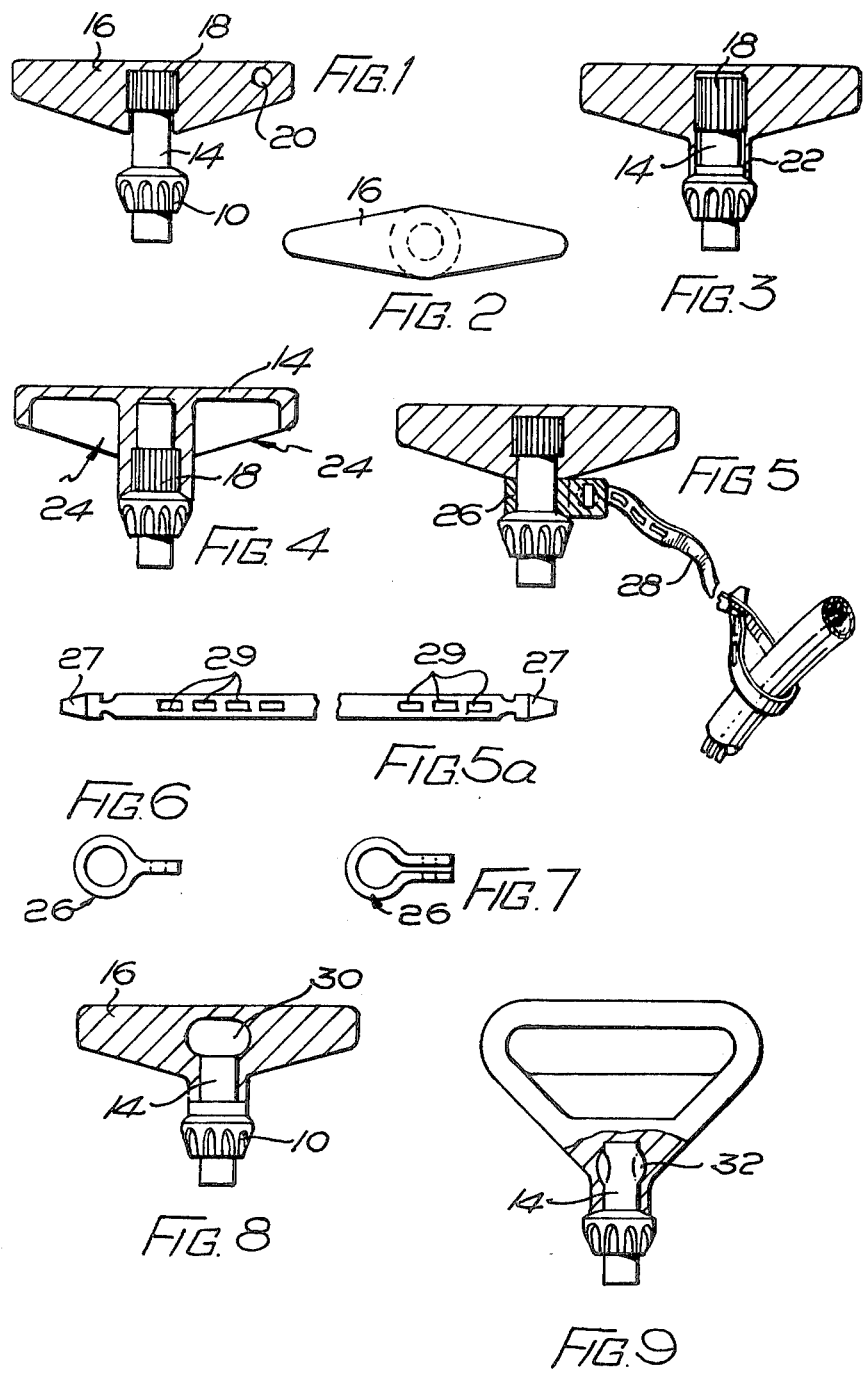

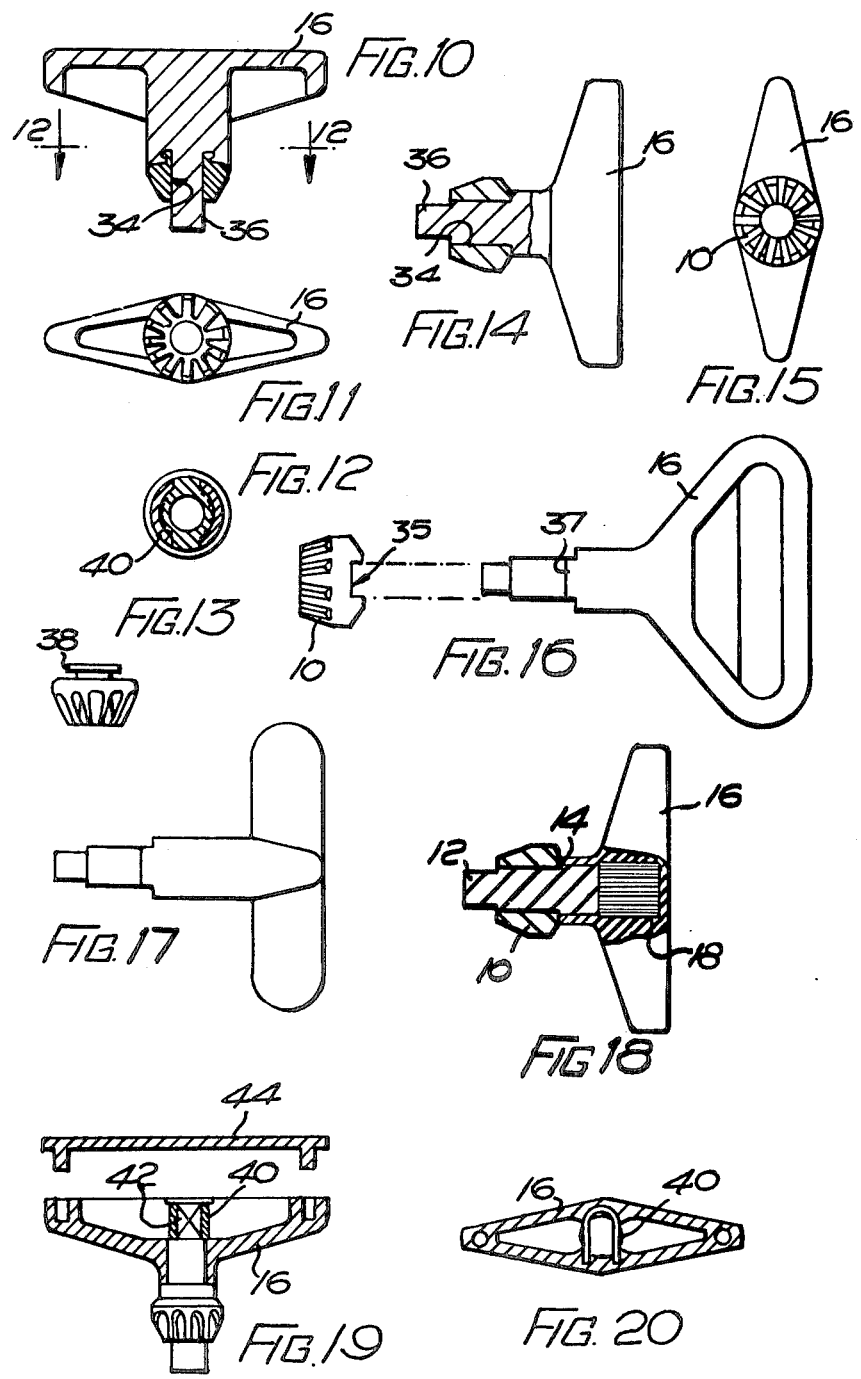

KEYS FOR DRILL CHUCKS

The invention relates to keys for drill chucks and has for its object to provide an improvement therein. This application is a division of patent application Ser. No. 753,578, filed Dec. 22, 1976 now abandoned.

According to the invention, there is provided a key for a drill chuck, the key including a geared head component and a handle component the latter being of machined, forged, cast or moulded form. The geared head component may have been formed with a shank having an end portion adapted (by being knurled or splined) to provide an effective "anchor" within the handle component either when the latter has been cast or moulded around that end of the shank or when the latter has been force fitted into a cavity formed in the handle, as the case may be. On the other hand, the handle may be rotatably mounted on the shank and be provided with an overload release mechanism for limiting the amount of torque which can be applied to the geared head component, such a mechanism conveniently being constituted by one or more spring elements housed within the handle and bearing against a flat surface, or respective flat surfaces as the case may be, formed on the shank. Such an overload release mechanism will preferably be such that the maximum applied torque when the chuck is being tightened will be lower than that when the chuck is being slackened. A lugged collar may be provided on the shank for the attachment of a leash by means of which the key can be permanently connected to a power drill or like tool.

The geared head component may be formed integrally with the pilot portion and with the shank portion. However, on the other hand the geared head component may be formed with a cylindrical bore through which extends a spigot portion formed, cast or moulded integrally with the handle, a projecting part of said spigot portion forming the pilot portion of the key. Alternatively, the geared head component may be of composite construction, being formed of a geared head element and a separate shank, the two having been subsequently joined together, for example by friction welding, by pressing or by the use of a suitable adhesive. Such a geared head element may be formed for example by forging or by the use of sintered metal techniques and may be formed integrally with the pilot portion of the key and with a spigot portion adapted to be received in a socket portion of the shank.

In order that the invention may be fully understood and readily carried into effect, the same will now be described, by way of example only, with reference to the accompanying drawings, of which:

FIG. 1 is a sectional side view of one form of drill chuck key embodying the invention.

FIG. 2 is a plan view thereof,

FIGS. 3 to 7 are views similar to FIG. 1 which illustrate possible modifications which will presently be referred to, and FIGS. 8 to 28 are further views which will be referred to when describing other forms of chuck keys embodying the invention.

Figure 21:
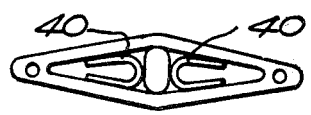

Referring now to FIGS. 1 and 2, the chuck key there illustrated includes a geared head component 10 (which has been formed with an integral pilot portion 12 and shank 14) and a handle component 16. In this particular embodiment the component 10 has been made by forging (but could have been machined from bar) and the handle component has been moulded in a synthetic plastics material around a splined outer end portion 18 of the shank 14. A small hole 20 has been moulded in the handle for hanging up of the key against loss or for the addition of a loop or for the attachment of a leash (not shown) by means of which the chuck key can be permanently connected to a drill the chuck of whict it is to operate (or connected to the electric cable of a portable power tool).

The chuck key just described is of an attractive appearance and it has been found that the shape of its handle is such that it affords a comfortable grip and facilitates the application of the required tightening torque to the geared head component. However, various minor modifications can be made to this form of chuck key. For example, in FIG. 3 the splined portion 18 of the shank 14 is shown to extend over a longer distance and the handle is shown to be provided with a skirt 22 which extends to the geared head. On the other hand, in FIG. 4 the splined portion 18 is shown to have been formed on the shank 14 adjacent the geared head and the handle component 16 is shown to have been formed with cavities 24 in its underside.

It will of course be understood that the chuck keys so far described could all have been made by moulding the handle as a component separate from the geared head component and then joining the two components together by forcing the shank 14 into the cylindrical cavity moulded in the handle, with or without the use of an adhesive. In fact, the construction of key illustrated in FIG. 4 is especially adapted to this method of manufacture since it can be arranged for the plain outer part of the shank to be entered easily into the cylindrical cavity moulded in the handle to act as a guide member before the splined portion 18 is force fitted in said cavity.

Referring now to FIG. 5, in a further modification of the chuck key described with reference to FIGS. 1 and 2, the plain portion of the shank 14 between the geared head and the synthetic plastics handle is shown to be loosely encircled by a lugged collar 26 to which is connected a flexible leash 28 by means of which the key is shown to be connected to the electric cable of a portable power tool (although of course it could equally well be connected to a part of the power tool or other suitable anchor point instead of to the electric cable). In FIG. 5a the leash illustrated is shown to be provided at each end with a notched head portion 27 which can be inserted through any one of a number of adjacent slots 29 to form a closed loop (or of course the notched head could be inserted through an eyelet or lug such as that of the collar 26) but it will be understood that any other form of leash may be employed if preferred. The collar 26 is of solid form as shown in end view in FIG. 6 so that of course it has been required to be threaded onto the shank 14 of the geared head component 10 before the latter has been united with the separately moulded handle component 16. However, in FIG. 7 there is shown in end view an alternative collar 26 which is of split form so that it can be sprung over or around the shank 14 and of course this can then be fitted to a key which has been formed in the manner of the key originally described with reference to FIGS. 1 and 2 or to a key the geared head and handle components of which have already been united together. (Such a collar 26 of split form could loosely surround the skirt portion 22 adjacent to the geared head in the construction shown in FIGS. 3 and 4. In this way the key would be able to rotate freely within the collar, thus preventing the leash becoming tangled as the chuck is tightened or untightened by the key).

Referring now to FIG. 8, this illustrates a chuck key very similar to those previously described except that the geared head component 10 has been formed with a shank 14 which terminates in a winged or flatted root portion 30. (The handle 16 in this case will have been moulded around the root portion).

Referring now to FIG. 9, in another form of chuck key embodying the invention, the handle component is of winged head form as shown and the shank 14 of the geared head component is shown to terminate in a crimped root portion 32 around which the handle component has been moulded. (However, it will be understood that this winged head form of handle could be fitted to any of the chuck keys previously described in which case the winged head could be of forged, stamped, cast or sintered metal construction).

In FIGS. 10, 11, 12 and 13 there is illustrated still a further form of chuck key embodying the invention. In this case it will be seen that the geared head component constitutes little more than the geared head and is formed with a cylindrical bore 34 for receiving a spigot portion 36 which has been moulded or cast integrally with the handle 16. However, the geared head is formed with a lipped annular projection 38 which is received in a depression of complementary shape in the handle part and it will be seen in FIG. 12 that the geared head is in addition formed with oppositely disposed key pieces 40 which merge with the projection 38 and engage complementary slots in the handle part so that a driving connection is established between the two.

The geared head component in this case may have been formed for example by machining or by forging or by sintered metal technology or by moulding or casting. The geared head component may have been placed in the mould prior to the moulding or casting of the handle part. On the other hand the handle part may have been moulded, cast or sintered prior to the two parts having been snapped together.

Referring now to FIGS. 14 and 15, the chuck key there illustrated is very similar to that just described but the geared head component 10 constitutes no more than the geared head and the handle part is of a somewhat different shape. In addition the spigot portion 36 is stepped down slightly from the cylindrical portion which is a tight fit in the bore 34 of the geared head.

In FIG. 16, which is an exploded view, a chuck key which is very similar to that just described has its handle part of a slightly different form and has a geared head component 10 which is exactly the same except for the fact that it has a shallow cross slot 35 for the reception of complementary key pieces 37 formed on the handle part. This particular construction lends itself to the idea of supplying one or more replacement geared head components with a chuck key of this kind so that when the teeth of the original geared head component become badly worn it can be removed from the cylindrical portion of the handle part so that a replacement can be fitted. This operation will of course be facilitated if the geared head component is made only a medium tight press fit on the cylindrical portion so that the removal of a worn component is not rendered too difficult. On the other hand of course it will be understood that other means may be employed for fixing a geared head component on the cylindrical portion of the handle part.

In FIG. 17 there is illustrated an alternative form of handle part which could be employed in the chuck key just described.

In FIG. 18 there is illustrated a chuck key having the same external appearance as the key illustrated in FIGS. 14 and 15 but it will be seen that the geared head component has been made of a composite construction, that is to say it has a metal shank 14 with an integral pilot portion 12 and a geared head 10 having a cylindrical bore, the geared head having been press fitted on said shank. A handle component 16 moulded in a synthetic plastics material or formed by forging, casting or sintering has been subsequently press fitted on the outer end portion of the shank which in this case has been shown splined but could be round, square, hexagonal or of mating shape to the bore in the handle.

Referring now to FIGS. 19 and 20, there is illustrated a chuck key the external appearance of which is almost exactly the same as that of the key described with reference to FIGS. 2 and 3. However, in this case it will be seen that the handle part is hollow and houses within it means, i.e. an overload release mechanism, for limiting the amount of torque which can be applied to the geared head component. The handle part itself is rotatably mounted on the shank portion of the geared head component but is provided with a recess within which a U-shaped element 40 made of flat steel strip is housed. The limbs of the element 40 normally lie against oppositely disposed flat surfaces 42 which are formed on the shank of the geared head component so that they can transmit drive thereto. However, the arrangement is such that if an excessive torque is applied to the handle part the limbs of the element 40 are deflected, that is to say caused to bow outwards away from each other, so that the handle part is able to turn relative to the geared head component. (The handle part is shown in FIG. 19 to be rotating freely on the shank of the geared head component. In FIG. 20 the parts are shown in their normal positions, that is to say before an excessive torque has been applied). The overload release mechanism just referred to is enclosed in the hollow interior of the handle by means of a cover piece 44.

In FIG. 21 there is illustrated a modification of the chuck key just described, the modification residing in the fact that the single U-shaped element of the overload release mechanism has been replaced by a pair of such elements placed within oppositely tapering parts of the hollow interior of the handle as shown so that their curved portions normally bear against the flat surfaces 42.

Figure 22:
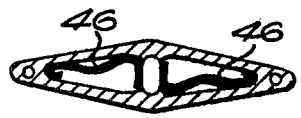

In a different modification shown in FIG. 22 the single U-shaped element 40 of the overload release mechanism has been replaced by a pair of substantially L-shaped spring steel elements 46 of slightly crinkled form and placed as shown in the oppositely disposed tapering parts of the hollow interior of the handle. The shape of the elements 46 is such that by trial and experiment they have been found to bear with the required torque transmitting pressures against the flat surfaces formed on the shank so that the handle can transmit the required maximum tightening torque to a drill chuck for efficient use without damage to the chuck and key gearing and related component parts. The self-locking action of the spring steel elements 46 when the key handle is reversed ensures that the chuck grip can be released because the arrangement is such that the applied torque transmitted when the chuck is being tightened is lower than when it is being slackened.

The various constructions so far described and illustrated (with the exception of those illustrated in FIGS. 10 to 18) have been described as having a geared head component formed with an integral pilot portion 12 and shank 14. However, the geared head component could be formed separately from the shank 14 and/or the pilot portion 12 in several ways.

Figure 23:
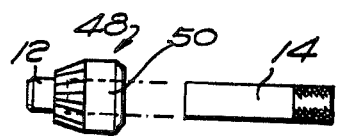
Figure 24:
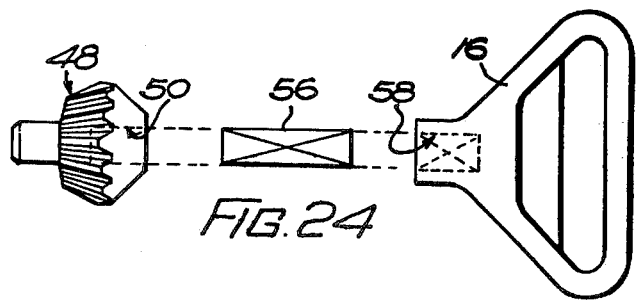

For example, FIG. 23 is an exploded view of a geared head component of composite construction having a geared head element generally indicated 48 (with an integral pilot portion 12 at one end and with a cylindrical socket portion 50 at the other) which has been made either by forging or by sintered metal technology or by machining or casting, and a separate cylindrical shank 14 with a knurled or splined portion 18 at one end, the shank having been formed from steel rod. The two components may be joined together with the shank located in the socket portion of the geared head element, in any one of a number of ways, for example by a friction welding technique or by the application of an adhesive such as "Loctite" (Registered Trade Mark). It will be understood that such a composite construction of geared head component may be used in any of the previously described forms of chuck key (with the exception of those described with reference to FIGS. 10 to 18 of course). It will also be understood that instead of being provided with a splined or knurled portion for the subsequent connection of the handle part the separate shank 14 in FIG. 23 could be formed integrally with a handle part as a projecting spigot portion for reception in the socket portion 50 of the geared head. Alternatively, instead of being formed with a cylindrical socket portion the geared head element could be formed with a socket portion of square, hexagonal or any such related form for the reception of one end of a driving element constituted by a short length of square, hexagonal or such related form of bar the other end of which is to be received in a similar socket portion of the handle part. Such a construction is shown in FIG. 24 where a geared head element 48 is formed with a socket portion 50 of square form, a driving element 56 is constituted by a short length of square bar, and a handle part is formed with a socket portion 58 of square form. The component parts will in this case be joined together by the application of a suitable adhesive or by the elements being of a press fit. (Obviously of course any other of the various shapes of handle previously illustrated could have been used in this instance, modified by the addition of the square shaped socket).

Figure 25:
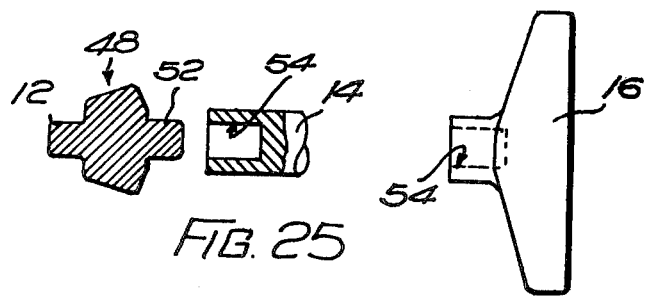
Figure 26:
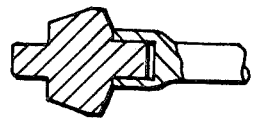
Figure 27:
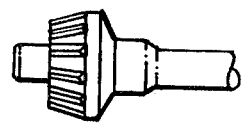

In FIG. 25 there is illustrated another form of composite construction of geared head component. In this case the geared head element 48 has been formed with an integral pilot portion 12 and with an integral spigot portion 52. The shank 14, which has again been formed from steel rod, is formed with a socket portion 54 at one end for the reception of the spigot portion 52 and as in the previous example the two components may be joined together in any one of a number of ways. (Here again it will be understood that the socketed shank part could be formed integrally with the handle part, for example as shown in FIG. 26. Alternatively, the socketed shank part may be drawn down component as shown in FIG. 27. Such a drawn down form of shank may be used in an integral geared head and shank construction as shown in FIG. 28 and arranged to fit many of the handle forms previously described or arranged to form its own integral handle).

Various other modifications may be made without departing from the scope of the invention expecially in the way in which the geared head component may be made of composite construction.

What is claimed is:

1. A key for a drill chuck comprising in combination, a geared head component and a handle component connected to the geared head component, said geared head component having a handle component connecting portion at one end, a pilot portion at the other end, and a tapered beveled gear portion located between the handle component connecting portion and the pilot portion, said handle portion being made of a synthetic plastic material and in cross section being further formed in the shape of two triangular sections with the sides of each tapering symmetrically toward respective apexes located on a common center line, said handle component being rotatably mounted on the geared head component and being provided with an overload release mechanism for limiting the amount of torque which can be applied to the geared head component, said overload release mechanism having a spring element housed within the handle component and bearing against a flat surface formed on the handle component connecting portion of the geared head component.

2. A key according to claim 1, in which the geared head component is of composite construction, being formed of a geared head element and a separate shank, the two having been subsequently joined together.

3. A key according to claim 2, in which the geared head component is formed integrally with the pilot portion and with a spigot portion received within a socket portion of the shank.

* * * * *